(12) United States Patent
Uehara et al.

(10) Patent No.: US 8,481,137 B2
(45) Date of Patent: Jul. 9, 2013

(54) MULTILAYERED STRETCHED FILM WITH BARRIER PROPERTY

(75) Inventors: Norio Uehara, Moriyama (JP); Hiroyuki Yoshizaki, Moriyama (JP); Naoyuki Maruichi, Moriyama (JP)

(73) Assignees: Gunze Limited, Ayabe-shi, Kyoto (JP); Dai Nippon Printing Co., Ltd, Tokyo (JP)

( * ) Notice: Subject to any disclaimer, the term of this patent is extended or adjusted under 35 U.S.C. 154(b) by 0 days.

(21) Appl. No.: 13/160,925

(22) Filed: Jun. 15, 2011

(65) Prior Publication Data

US 2012/0040117 A1 Feb. 16, 2012

(30) Foreign Application Priority Data

Nov. 5, 2009 (JP) ................................ 2009-253686

(51) Int. Cl.
- *B29D 22/00* (2006.01)
- *B29D 23/00* (2006.01)
- *B32B 1/08* (2006.01)

(52) U.S. Cl.
USPC ....... 428/35.7; 428/35.2; 428/35.3; 428/35.8; 428/35.9; 428/474.4; 428/475.2

(58) Field of Classification Search
USPC ............... 428/35.2, 35.3, 35.7, 35.8, 35.9, 428/474.4, 475.2
See application file for complete search history.

(56) References Cited

U.S. PATENT DOCUMENTS

| | | | | |
|---|---|---|---|---|
| 4,309,466 A | * | 1/1982 | Stillman | 428/35.3 |
| 5,939,205 A | * | 8/1999 | Yokoyama et al. | 428/474.4 |
| 6,565,985 B2 | * | 5/2003 | Ueyama et al. | 428/474.4 |
| 2004/0033382 A1 | | 2/2004 | Kendig | |
| 2004/0166262 A1 | | 8/2004 | Busche et al. | |
| 2011/0315590 A1 | | 12/2011 | Uehara et al. | |

FOREIGN PATENT DOCUMENTS

| | | |
|---|---|---|
| JP | 10-007904 A | 1/1998 |
| JP | 2007-160770 A | 6/2007 |

OTHER PUBLICATIONS

USPTO Office Action dated May 15, 2012, issued in U.S. Appl. No. 13/160,898 (14 pages).
Japanese Office Action dated Dec. 4, 2012, issued in corresponding Japanese Patent Application No. 2009-253686 (2 pages).
Japanese Office Action dated Dec. 4, 2012, issued in corresponding Japanese Patent Application No. 2009-253680 (2 pages).
USPTO Office Action dated Jan. 23, 2013, issued in U.S. Appl. No. 13/160,898 (16 pages).

* cited by examiner

*Primary Examiner* — Michael C Miggins
(74) *Attorney, Agent, or Firm* — Westerman, Hattori, Daniels & Adrian, LLP

(57) ABSTRACT

An object of the invention is to provide a multilayer stretched film with barrier property that is free from deterioration of barrier properties attributable to dimensional change caused by moisture absorption, and bending, etc. [Method for Achieving the Object]
A multilayer stretched film with barrier property obtained by biaxially stretching a multilayer laminate comprising at least three layers, namely, a polyester-based resin layer (Layer A), a polyamide-based resin layer (Layer B), and a polyester-based resin layer (Layer A), in this order (wherein the two Layers A may be the same or different) to obtain a biaxially stretched multilayer film; and providing a deposition layer (Layer C) on at least one surface of the biaxially stretched multilayer film;
both of the Layers A containing a crystalline polyester;
Layer B containing 70 to 99 wt % of aliphatic polyamide and 1 to 30 wt % of aromatic polyamide; and
Layer C containing an inorganic substance.

9 Claims, No Drawings

MULTILAYERED STRETCHED FILM WITH BARRIER PROPERTY

TECHNICAL FIELD

The present invention relates to a multilayer stretched film having excellent barrier properties against oxygen gas and/or water vapor, and a multilayer stretched film that can prevent the occurrence of cracking caused by bending and moisture absorption.

BACKGROUND ART

One example of a conventionally known film having desirable gas barrier properties, toughness, pinhole resistance, etc., usable as a packaging film is that obtained by depositing an inorganic substance on the surface of a polyester-based film or polyamide-based film, to form a deposition layer.

However, because a polyester-based film is hard, it does not have sufficient bending resistance. Further, pinholes are formed in the deposition layer provided on the polyester-based film due to bending, adversely affecting the barrier properties.

In contrast, a polyamide-based film has a high pinhole resistance. However, it is subject to dimensional change caused by moisture absorption. This generates cracking in the deposition film provided on the polyamide-based film due to the dimensional change of the polyamide-based film, adversely affecting the barrier properties.

As described above, there is currently no multilayer stretched film with barrier property that is totally free from dimensional change due to moisture absorption and/or deterioration of barrier properties caused by bending, and the like.

PRIOR ART DOCUMENT

Patent Document

[Patent Document 1] Japanese Unexamined Patent Publication No. 2007-160770

SUMMARY OF INVENTION

Problem to be Solved by the Invention

An object of the present invention is to provide a multilayer stretched film with barrier property whose barrier properties will not be adversely affected by the dimensional change caused by moisture absorption, and bending, etc.

Means for Solving the Problem

The present inventors conducted extensive research in order to solve the above problems and found that a multilayer stretched film with barrier property that solves the above problems can be obtained by the following process. First, a biaxially stretched multilayer film is obtained by biaxially stretching a multilayer laminate comprising at least three layers, namely, a polyester-based resin layer (Layer A), a specific polyamide-based resin layer (Layer B), and a polyester-based resin layer (Layer A), in this order (wherein the two Layers A may be the same or different). Then, a deposition layer (Layer C) is provided on at least one surface of the biaxially stretched multilayer film to obtain a multilayer stretched film with barrier property. The present invention has been accomplished based on these findings. More specifically, the present invention provides the following multilayer stretched film with barrier property.

Item 1. A multilayer stretched film with barrier property obtained by biaxially stretching a multilayer laminate comprising at least three layers, namely, a polyester-based resin layer (Layer A), a polyamide-based resin layer (Layer B), and a polyester-based resin layer (Layer A), in this order (wherein the two Layers A may be the same or different) to obtain a biaxially stretched multilayer film; and providing a deposition layer (Layer C) on at least one surface of the biaxially stretched multilayer film;

both of the Layers A containing a crystalline polyester,

Layer B containing 70 to 99 wt % of aliphatic polyamide and 1 to 30 wt % of aromatic polyamide; and Layer C containing an inorganic substance.

Item 2. The multilayer stretched film with barrier property according to Item 1, wherein the total thickness of Layers A is 1 to 20 μm, the thickness of Layer B is 5 to 49 μm, and the total thickness of the biaxially stretched multilayer film is 10 to 50 μm.

Item 3. The multilayer stretched film with barrier property according to Item 1 or 2, wherein the crystalline polyester contained in Layer A is at least one member selected from the group consisting of polyethylene terephthalates (PETs), isophthalic acid copolymerized polyethylene terephthalates, polybutylene terephthalates and sulfoisophthalic acid copolymerized polyethylene terephthalates.

Item 4. The multilayer stretched film with barrier property according to any one of Items 1 to 3, wherein the aliphatic polyamide-based resin contained in Layer B is at least one member selected from the group consisting of nylon-6 and copolymers of nylon-6 and nylon-6,6.

Item 5. The multilayer stretched film with barrier property according to any one of Items 1 to 4, wherein the aromatic polyamide-based resin contained in Layer B is polymethaxyleneadipamide or amorphous nylon.

Item 6. The multilayer stretched film with barrier property according to any one of Items 1 to 5, wherein the inorganic substance contained in Layer C is at least one member selected from the group consisting of silicon oxide, aluminum oxide, magnesium oxide and aluminum.

Item 7. A packaging film obtained by laminating a sealing layer on the deposition layer of the multilayer stretched film with barrier property of any one of Items 1 to 6.

Item 8. A packaging bag obtained by forming the packaging film of Item 7 into a bag-like shape, and then heat-sealing the facing surfaces of the sealing layer.

Item 9. A package comprising the packaging bag of Item 8 with content placed inside.

Effect of the Invention

The multilayer stretched film with barrier property of the present invention has excellent dimensional stability and bending resistance. The multilayer stretched film with barrier property of the present invention having such excellent properties is desirably used as a packaging film.

MODE FOR CARRYING OUT THE INVENTION

1. Multilayer Stretched Film with Barrier Property

The multilayer stretched film with barrier property of the present invention is characterized in that it comprises a biaxially stretched multilayer film obtained by biaxially stretching a multilayer laminate comprising at least three layers, namely, a polyester-based resin layer (Layer A), a polyamide-based resin layer (Layer B), and a polyester-based resin layer (Layer A), in this order (wherein the two Layers A may be the same or different) and a deposition layer (Layer C) provided on at least one surface of the biaxially stretched multilayer film, wherein both of the Layers A contain crystalline polyester,
Layer B contains 70 to 99 wt % of aliphatic polyamide and 1 to 30 wt % of aromatic polyamide; and
Layer C contains an inorganic substance.

The structure of each part of the multilayer stretched film with barrier property of the present invention is described below. Hereunder, the multilayer stretched film with barrier property may be referred to simply as a multilayer stretched film.

(1) Layer A

Layer A imparts dimensional stability, heat resistance, and like properties to the multilayer stretched film of the present invention. In particular, the application of dimensional stability can suppress the lowering of gas barrier properties when wet. Furthermore, two or more Layers A are provided in the present invention, and Layer A, Layer B, and Layer A are formed in this order (as in the embodiments of later-described Examples 1 to 5).

Each Layer A contains crystalline polyester as the main component. The crystalline polyester is not particularly limited as long as it can impart dimensional stability, heat resistance, and like properties to the multilayer stretched film of the present invention. Examples of crystalline polyesters include resins obtained by polycondensation of dicarboxylic acid and diol.

Examples of dicarboxylic acids include o-phthalic acid, terephthalic acid, isophthalic acid, succinic acid, adipic acid, sebacic acid, azelaic acid, octylsuccinic acid, cyclohexanedicarboxylic acid, naphthalene dicarboxylic acid, fumaric acid, maleic acid, itaconic acid, decamethylenecarboxylic acid, and anhydrides and lower-alkyl esters thereof; and 5-sulfoisophthalic acid, 2-sulfoisophthalic acid, 4-sulfoisophthalic acid, 3-sulfophthalic acid, dialkyl 5-sulfoisophtharate, dialkyl 2-sulfoisophtharate, dialkyl 4-sulfoisophtharate, dialkyl 3-sulfoisophtharate, sodium salts and potassium salts thereof, and like sulfonyl-containing dicarboxylic acids.

Examples of diols include ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol, and like aliphatic diols; 2,2-bis(4-hydroxycyclohexyl)propane, 2,2-bis(4-hydroxycyclohexyl)propane, and like alkylene oxide adducts; 1,4-cyclohexanediol, 1,4-cyclohexanedimethanol, and like alicyclic diols; and 1,3-dihydroxy butanesulfonic acid, 1,4-dihydroxy butanesulfonic acid, and like sulfonyl-containing diols.

Among these, preferable are polyethylene terephthalates (PETs) comprising terephthalic acid as a component derived from dicarboxylic acid, and ethylene glycol as a component derived from a diol; isophthalic acid copolymerized polyethylene terephthalates comprising terephthalic acid (99 to 80 mol %) and isophthalic acid (1 to 20 mol %) as components derived from dicarboxylic acid, and ethylene glycol as a component derived from a diol; polybutylene terephthalate (PBT) comprising terephthalic acid as components derived from dicarboxylic acid, and 1,4-butanediol as components derived from a diol; and sulfoisophthalic acid copolymerized polyethylene terephthalates comprising terephthalic acid (99.5 to 90 mol %) and 5-sodium sulfoisophtharic acid (0.5 to 10 mol %) as components derived from dicarboxylic acid, and ethylene glycol as a component derived from a diol from the viewpoint of dimensional stability, heat resistance, and the like. Polyethylene terephthalates (PETs) comprising terephthalic acid and ethylene glycol are more preferable.

These crystalline polyesters are commercially available. For example, BELLPET-EFG6C, BELLPET-PIFG5 (both are produced by Bell Polyester Products, Inc.), and the like may be used as the crystalline polyester for forming Layer A.

The crystalline polyesters for forming Layer A may be used singly or in a combination of two or more, if necessary.

Layer A may contain one or more resins that are compatible with crystalline polyester, if necessary. In that case, the crystalline polyester content is generally 50 wt. % or more, and preferably 70 wt. % or more per total weight of the components of Layer A.

Examples of resins compatible with crystalline polyester include amorphous polyesters, and the like. Amorphous polyesters are those in which the amount of fusion heat is not observed in differential scanning calorimetry performed according to JIS K 7121. The amorphous polyesters are not particularly limited as long as they have such properties. Specific examples of preferable amorphous polyesters include polyesters comprising terephthalic acid as a component derived from dicarboxylic acid, and ethylene glycol (20 to 80 mol %) and cyclohexane dimethanol (80 to 20 mol %) as components derived from a diol; and polyesters comprising terephthalic acid (20 to 80 mol %) and isophthalic acid (80 to 20 mol %) as components derived from dicarboxylic acid, and ethylene glycol as a component derived from a diol. Such amorphous polyesters are commercially available, and examples thereof include Eastar Copolyester 6763 (produced by Eastman Chemical Company), and the like.

Known inorganic or organic additives and the like may be added to Layer A in an amount that does not impair the effect of the present invention. Examples of inorganic or organic additives include anti-blocking agents, nucleating agents, water repellents, antioxidants, thermostabilizers, lubricants, antistatic agents, colorants, pigments, dyes, and the like. These additives may be used in a suitable amount.

(2) Layer B

Layer B imparts bending resistance, impact resistance, and like properties to the multilayer stretched film of the present invention. In particular, the application of bending resistance can suppress the lowering of gas barrier properties after bending.

Layer B contains aliphatic polyamide and aromatic polyamide.

(2-1) Aliphatic Polyamide

Examples of aliphatic polyamides include aliphatic nylons and copolymers thereof. Specific examples thereof include polycapramide (nylon-6), poly-ω-aminoheptanoic acid (nylon-7), poly-ω-aminononanoic acid (nylon-9), polyundecanoamide (nylon-11), poly(lauryl lactam) (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,8), caprolactam/lauryl lactam copolymer (nylon-6/12), caprolactam/ω-aminononanoic acid copolymer (nylon-6/9), caprolactam/hexamethylene diammonium adipate copolymer (nylon-6/6,6), lauryl lactam/hexamethylene diammonium adipate copolymer (nylon-12/6,6), ethylenediamine adipamide/hexamethylene diammonium adipate copolymer (nylon-2,6/6,6), caprolactam/hexamethylene diammonium adipate/hexamethylene diammonium sebacate copolymer (nylon-6/6,6/6,10), ethylene ammonium adipate/ hexamethylene diammonium adipate/hexamethylene diammonium sebacate copolymer (nylon-6/6,6/6,10), and the like. Two or more of these aliphatic polyamides may be used in combination.

Examples of preferable aliphatic polyamides include nylon-6, nylon-6,6, nylon-6/6,6 (a copolymer of nylon-6 and nylon-6,6), and the like. Among these, nylon-6 and nylon-6/6,6 are more preferable, and nylon-6 is particularly preferable. As for a combination of two or more aliphatic polyamides, a combination of nylon-6 and nylon-6/6,6 (weight ratio of about 50:50 to 95:5) is preferable.

(2-2) Aromatic Polyamide

Examples of aromatic polyamides include crystalline aromatic polyamides obtained by a polycondensation reaction of metaxylenediamine, paraxylenediamine, or like aromatic diamine with adipic acid, suberic acid, sebacic acid, cyclohexanedicarboxylic acid, terephthalic acid, isophthalic acid, or like dicarboxylic acid, or a derivative thereof. A preferable example thereof is a crystalline aromatic polyamide, such as polymethaxyleneadipamide (MXD-nylon). Specific examples include S-6007 and S-6011 (both are produced by Mitsubishi Gas Chemical Company, Inc.).

It is also possible to use amorphous aromatic polyamides (amorphous nylons) obtained by a polycondensation reaction of hexamethylene diamine or like aliphatic diamine with terephthalic acid, isophthalic acid, or like dicarboxylic acid, or a derivative thereof. Preferable examples thereof include copolymers of hexamethylene diamine, terephthalic acid, hexamethylene diamine, and isophthalic acid. A specific example is Selar PA (produced by DuPont-Mitsui Polychemicals Co., Ltd.).

Examples of preferable combinations of aliphatic polyamide and aromatic polyamide for Layer B of the present invention include a combination of nylon-6 and MXD-nylon, and a combination of nylon-6 and amorphous aromatic polyamide (amorphous nylon).

(2-3) Contents

In Layer B of the multilayer stretched film of the present invention, the content of the aliphatic polyamide and the content of the aromatic polyamide are adjusted so that the content of the aliphatic polyamide is 70 to 99 wt %, and preferably 85 to 97 wt %, and the content of the aromatic polyamide is 1 to 30 wt %, and preferably 3 to 15 wt %. When the content of the aliphatic polyamide exceeds 99 wt %, i.e., the content of the aromatic polyamide is less than 1 wt %, the biaxial stretchability is unduly lowered, making film formation difficult. In contrast, when the content of the aliphatic polyamide is less than 70 wt %, i.e., the content of the aromatic polyamide exceeds 30 wt %, the bending resistance is lowered.

Layer B may consist of the aforementioned polyamide-based resins; however, known bending resistance-improving agents, inorganic or organic additives, and the like may be added if necessary, insofar as they do not impair the effects of the present invention. Examples of bending resistance-improving agents include polyolefins, polyester elastomers, polyamide elastomers, and the like. The content of the bending resistance-improving agent may be suitably selected within the range of 0.5 to 10 wt. %. Examples of inorganic or organic additives include anti-blocking agents, nucleating agents, water repellents, antioxidants, thermostabilizers, lubricants, antistatic agents, and the like. When an anti-blocking agent is used, silica, talc, kaolin, and the like may be added within the range of about 100 to 5,000 ppm. Also, the number of Layers B is not limited to one, but two or more layers may be provided.

(3) Layer C

Layer C imparts gas barrier properties, moisture resistance, aroma retention, and like properties to the multilayer stretched film of the present invention.

Layer C contains an inorganic substance. The inorganic substance is not particularly limited as long as it can form a film having gas barrier properties against oxygen, water vapor, and the like when deposited on Layer A or Layer B. Examples of such inorganic substances include silicon oxide, aluminum oxide, magnesium oxide, and like metal oxides; and aluminum and like metals. Among these, metal oxides are preferable and silicon oxides are more preferable from the viewpoint of transparency, allowing metal contaminant detection, etc.

There are various methods for forming Layer C, such as vacuum deposition, sputtering, ion plating, and plasma vapor growth (CVD) methods. Among these, the vacuum deposition method is preferable as it achieves excellent productivity.

Examples of the heating means for use in the vacuum deposition method include electron-beam heating, resistance heating, and induction heating. Among these, electron-beam heating is preferred as it exhibits a wide range of selectivity for the evaporation material. In order to increase the denseness of Layer C, plasma assisted deposition or ion beam assisted deposition may be employed. In order to increase the transparency of Layer C, it is also possible to employ reactive deposition, in which various gases such as oxygen are injected during vapor deposition.

(4) Adhesive Layer

In the present invention, an adhesive layer may be formed in order to increase the interlaminar strength between Layer A and Layer B. The presence of the adhesive layer remarkably increases the interlaminar strength therebetween after adhesion. The adhesive layer is not particularly limited and is formed between Layer A and Layer B in the multilayer stretched film of the present invention. One example of a usable material for the adhesive layer is an acid-modified resin that is graft modified with unsaturated carboxylic acid or its derivative.

Examples of acid-modified resins that are graft modified with unsaturated carboxylic acid or its derivative include modified polyolefins and modified styrene-based elastomers.

Modified polyolefins can be produced by a known method, for example, unsaturated carboxylic acid or its derivative is mixed with polyolefin while being heated in the presence of a radical generator.

Examples of unsaturated carboxylic acid or its derivative include maleic acid, fumaric acid, and like unsaturated carboxylic acids; acid anhydrides thereof; and esters or metal salts thereof (e.g., sodium salt, potassium salt, calcium salt).

Examples of polyolefins include homopolymers of olefins, copolymers of olefins, copolymers with other copolymerizable monomers (e.g., other vinyl-based monomers). Specific examples thereof include polyethylene (e.g., low-density polyethylene (LDPE) and linear low-density polyethylene (LLDPE)), polypropylene, polybutene, copolymers of olefins, ionomer resins, ethylene-acryl acid copolymers, and ethylene-vinyl acetate copolymers.

A preferable example of a modified polyolefin is a maleic anhydride modified polyolefin. Specific examples thereof include maleic anhydride modified polyolefin resins (e.g., ADMER SF731 and ADMER SE800 produced by Mitsui Chemicals, Inc.; and MODIC produced by Mitsubishi Chemical Corporation).

The modified styrene-based elastomer can be produced by a known method, for example, an unsaturated carboxylic acid or its derivative is mixed with a styrene-based elastomer while being heated in the presence of a radical polymerization initiator.

Examples of styrene-based elastomers include hydrogenated styrene-butadiene copolymers and hydrogenated styrene-isoprene copolymers.

Examples of unsaturated carboxylic acids or derivatives thereof include maleic acid, fumaric acid, and like unsaturated carboxylic acids; acid anhydrides thereof; and esters or metal salts thereof (e.g., sodium salt, potassium salt, calcium salt).

Preferable examples of modified styrene-based elastomers include hydrogenated styrene-butadiene copolymers modified with maleic anhydride. Specific examples thereof include hydrogenated styrene-butadiene copolymers modified with maleic anhydride (e.g., Kraton FG1901 produced by Kraton Polymers, Inc., and Tuftec M1913, produced by Asahi Kasei Chemicals Corporation).

(5) Layer Structure

The multilayer stretched film of the present invention comprises a biaxially stretched multilayer film obtained by biaxially stretching a multilayer laminate comprising at least three layers of Layer A, Layer B, and Layer A, in this order (wherein the two Layers A may be the same or different), and Layer C provided on at least one surface. Here, the number of Layers A is not limited to two, but three or more layers may be provided. Furthermore, the number of Layers B is not limited to one, but two or more layers may be provided. Note that the resins used in the plurality of Layers A and the thickness of the layers may be the same or different. Similarly, when a plurality of Layers B are provided, the resin used and the thickness thereof may be the same or different. Furthermore, an adhesive layer (Layer D), a gas barrier layer (Layer E), a sealing layer (Layer F), and the like may be provided, if necessary.

Specific examples of such a structure are Layer A/Layer B/Layer A/Layer C, Layer A/Layer A/Layer B/Layer A/Layer C, Layer A/Layer A/Layer B/Layer A/Layer A/Layer C, Layer A/Layer B/Layer A/Layer A/Layer C, Layer A/Layer A/Layer B/Layer B/Layer A/Layer A/Layer C, Layer A/Layer D/Layer B/Layer D/Layer A/Layer C, Layer A/Layer B/Layer E/Layer B/Layer A/Layer C, and Layer A/Layer B/Layer A/Layer C/Layer F. The multilayer stretched films having these layer structures can suppress the lowering of gas barrier properties when wet.

Here, the gas barrier layer is a layer having low permeability of gases such as oxygen, nitrogen, and carbon dioxide. Specific examples thereof include ethylene-vinyl alcohol-based copolymers and aromatic polyamides.

Ethylene-vinyl alcohol-based copolymers are obtained by saponification of ethylene-vinyl acetate copolymers. The ethylene content of an ethylene-vinyl alcohol-based copolymer is 20 to 70 mol %, and preferably 25 to 50 mol %. When the ethylene content is below 20 mol %, heat stability and moldability become poor; gel and like foreign substances are thereby easily generated during extrusion melt molding, and the film tends to tear easily during stretching. When the ethylene content exceeds 70 mol %, sufficient barrier properties cannot be obtained. The ethylene-vinyl alcohol-based copolymer may be copolymerized or blended with other known components that do not cause remarkable lowering of gas barrier properties. Further, the ethylene-vinyl alcohol-based copolymer may be blended with an ethylene-vinyl alcohol-based copolymer having different constituents. Examples of commercially available ethylene-vinyl alcohol-based copolymer products include Eval (produced by Kuraray Co., Ltd.), Soarnol (produced by Nippon Synthetic Chemical Industry Co., Ltd.), and the like.

Examples of aromatic polyamides include crystalline aromatic polyamides obtained by a polycondensation reaction of metaxylenediamine, paraxylenediamine, or like aromatic diamine with adipic acid, suberic acid, sebacic acid, cyclohexanedicarboxylic acid, terephthalic acid, isophthalic acid, or like dicarboxylic acid or a derivative thereof. A preferable example thereof is a crystalline aromatic polyamide such as polymethaxyleneadipamide (MXD-nylon). Specific examples include S-6007 and S-6011 (both produced by Mitsubishi Gas Chemical Company, Inc.).

The sealing layers are not limited as long as they exhibit sealing properties. Examples of sealing layers include LLDPE (linear low-density polyethylene), LDPE (low-density polyethylene), HDPE (high-density polyethylene), and like polyethylenes; CPP (cast polypropylene), and like polypropylenes; or EVA (ethylene-vinyl acetate copolymer), EAA (ethylene-acrylic acid copolymer), EMAA (ethylene-methacrylic acid copolymer), EMA (ethylene-methyl acrylate copolymer), EEA (ethylene-ethyl acrylate copolymer), EMMA (ethylene-methylmetacrylate copolymer), ionomer, and like polyolefins. These resins can be used singly, or in a combination of two or more.

Examples of the method for obtaining a sealing layer include dry lamination, extrusion lamination, and like lamination methods. Dry lamination is a method in which an adhesive is applied to the multilayer stretched film of the present invention, and the sealing layer film is laminated on the adhesive; the sealing layer is thereby laminated on the multilayer stretched film. Extrusion lamination is a method in which a resin forming the sealing layer is extruded from an extruding machine, after which the resin is laminated on the multilayer stretched film of the present invention as a sealing layer; or a method in which a resin, such as polyethylene, is extruded from an extruding machine to the space between the multilayer stretched film of the present invention and the film of the sealing layer, thereby laminating the sealing layer on the multilayer stretched film of the present invention. When the sealing layer is laminated by means of extrusion lamination, it is preferred that the multilayer stretched film of the present invention be previously subjected to anchor coat treatment.

The total film thickness of the multilayer stretched film of the present invention is not particularly limited, and may be suitably determined according to the application. The total film thickness thereof is generally about 10 to 50 µm and preferably about 12 to 25 µm.

The thickness of Layer A is generally about 1 to 20 µm, and preferably about 2 to 15 µm. When Layer A has a thickness of 1 µm or more, dimensional stability, heat resistance and like excellent properties can be imparted to the multilayer stretched film of the present invention. When Layer A has a thickness of 20 µm or less, a film having excellent bending resistance can be obtained. A plurality of Layers A are formed in the present invention, and the thickness of Layer A indicates the total thickness of the plurality of Layers A.

The thickness of Layer B is generally about 5 to 49 µm, and preferably about 8 to 23 µm. When Layer B has a thickness of 5 µm or more, bending resistance, impact resistance and like excellent properties can be imparted to the multilayer film of the present invention. As long as the thickness of Layer B is 49 µm or less, satisfactory impact strength can be obtained without increasing production costs. When a plurality of Layers B are formed, the thickness of Layer B indicates the total thickness of the plurality of Layers B.

The thickness of Layer C is generally about 10 to 200 nm, and preferably about 20 to 150 nm. When the thickness of Layer C is 10 nm or more, gas barrier properties, moisture resistance, and aroma retention can be imparted to the multilayer film of the present invention. When the thickness thereof is 200 nm or less, a deposition layer having excellent gas barrier properties, moisture resistance, and aroma retention, as well as satisfactory cracking resistance can be obtained.

When an adhesive layer is provided, the adhesive layer preferably has a thickness of about 0.5 to 5 μm, and more preferably about 0.5 to 2.5 μm. When the adhesive layer has a thickness of 0.5 μm or more, the film thickness can be easily controlled, whereas when the adhesive layer has a thickness of 5 μm or less, sufficient adhesive strength can be imparted and production costs can be reduced.

A preferable embodiment of the multilayer stretched film of the present invention is shown below.

Reference 1. Layer A comprises Layer A-1 formed of PET (film thickness of 1 to 8 μm) and Layer A-2 formed of PET (film thickness of 1 to 8 μm); Layer B comprises nylon-6 and amorphous nylon, with nylon-6 content being 85 to 97 wt % and amorphous nylon content being 3 to 15 wt % (film thickness of 8 to 23 μm); and Layer C is formed of silicon oxide (film thickness of 20 to 150 nm); wherein Layer A-1, Layer B, Layer A-2, and Layer C are laminated in this order.

2. Production Method

In the multilayer stretched film of the present invention, each layer is laminated by biaxial stretching to form the aforementioned layer structure. For example, the multilayer stretched film of the present invention is produced according to the following method. Resin for each layer is extruded at a temperature of 200 to 300° C., then the resin layers are co-extruded in an appropriate order from a T-die onto a 20 to 40° C. chilled roll where cooling water is circulating, to obtain a flat laminated film. The film thus obtained is then, for example, stretched to 2 to 4 times its original size in the machine direction using a 50 to 100° C. roll stretching machine, and further stretched to 3 to 5 times its original size in the transverse direction using a tenter stretching machine at an atmospheric temperature of 90 to 150° C. Subsequently, the film is thermally treated at an atmospheric temperature of 100 to 240° C. using the tenter stretching machine. The multilayer stretched film of the present invention may also be subjected to simultaneous or sequential biaxial stretching, and the obtained multilayer stretched film may be treated with corona discharge surface treatment on one or both sides, if necessary.

Corona discharge treatment is performed as follows. High voltage (several thousand volts) is applied between a grounded metal roller and knife-shaped electrodes that are aligned on the metal roller at an interval of several millimeters to generate corona discharge. A film passes through the space between the roller and the discharging electrodes at high speed, during which the surface of the film is treated by corona discharge. Affinity for adhesive, ink, paint, etc., is thereby improved. The degree of the treatment can be determined by controlling the discharging current. The surface after corona discharge treatment has a wetting tension of 46 mN/m or more, and preferably 50 mN/m or more. The wetting tension is measured by the method according to JIS K 6768.

3. Characteristics of the Multilayer Stretched Film of the Present Invention

The multilayer stretched film of the present invention has excellent dimensional stability and bending resistance, making it suitable for use as a packaging film.

Oxygen Permeability

The multilayer stretched film of the present invention can suppress oxygen permeation both when it is dry and wet. More specifically, under the conditions of 20° C.×65% RH and 20° C.×90% RH, the oxygen permeability measured according to JIS K 7126 was 10 ml/m$^2$·day·MPa or less and 20 ml/m$^2$·day·MPa or less. The evaluation of oxygen permeability was performed in the same manner as described in Test Example 1.

Oxygen Permeability After Bending

The multilayer stretched film of the present invention has excellent oxygen permeability after bending. Specifically, it has oxygen permeability of 80 ml/m$^2$·day·MPa or less after conducting Gelbo flex testing at standard (ordinary) temperature (20° C.)×10 times, measured under the conditions of 20° C.×65% RH according to JIS K 7126. The bending evaluation was conducted as described in Test Example 1.

Since the multilayer stretched film of the present invention has the aforementioned characteristics, it is suitable for use as a packaging film. When the multilayer stretched film is used as a packaging film, a sealing layer is laminated on the Layer C side of the film. The packaging film is formed into a bag with the outermost layer facing outward, and the facing surfaces of the sealing layer are heat-sealed to form a packaging bag. Heat-sealing may be done by any known method.

The packaging bag thus obtained is filled with content to form a package. The kind of content to be packed is not limited. However, the effects of the present invention are significantly exhibited particularly when the content to be packed is a liquid-based food, such as a soup, konnyaku (devil's tongue), tsukemono (a pickled vegetable), etc.; a food that is heavy in weight, such as mochi (rice cake), a sausage, seasoning, etc.; a liquid that is heavy in weight, such as refillable shampoo, conditioner, body soap, detergent, etc.; content that requires a large bag capacity, such as rice, ice, etc.; and content that has a strong smell, such as soy sauce, vinegar, etc. Examples of packaging bag forms include a three-side seal form, an envelope form, a gusset form, a flat bottom form, and other bag forms; and a standing pouch, a spout pouch, a refillable pouch, and the like.

EXAMPLES

Hereinafter, the present invention is described with reference to Examples. However, the present invention is not limited to these Examples.

Example 1

Layer A-1 formed of BELLPET-EFG6C polyethylene terephthalate (produced by Bell Polyester Products, Inc.) and Layer A-2 formed of BELLPET-EFG6C polyethylene terephthalate (produced by Bell Polyester Products, Inc.) were used as Layers A, and a resin containing 90 wt % of UBE Nylon 1022B aliphatic polyamide nylon-6 (produced by Ube Industries Ltd.), and 10 wt % of Selar PA amorphous nylon (produced by DuPont-Mitsui Polychemicals Co., Ltd.), was used to form Layer B.

Using three extruders, the resin of Layer A-1 was melted at 280° C., the resin of Layer A-2 was melted at 280° C., and the resin of Layer B was melted at 260° C., and the molten resins were coextruded from a T-die (280° C.) to form a flat film of three layers laminated in the order of Layer A-1/Layer B/Layer A-2 on a chill roll (30° C.) where cooling water was circulating. The thus obtained three-layer film was stretched to 3.0 times its original size in the machine direction using a roll stretching machine at 65° C., and stretched to 4.0 times its original size in the transverse direction using a tenter stretching machine at an atmospheric temperature of 110° C. Subsequently, the film was thermally treated at an atmospheric temperature of 210° C. using the same tenter stretching machine to form a 15 μm-thick three-layered film. The thickness of each layer was as follows. Layer A-1: 2 μm, Layer B: 11 μm, and Layer A-2: 2 μm.

Layer C formed of silicon oxide having a thickness of 60 nm was formed on the Layer A-2 side of the resulting film using a vacuum deposition device with a vacuum of 1×10$^{-4}$ Torr to obtain the multilayer stretched film of the present invention.

Example 2

A multilayer stretched film of the present invention was formed in the same manner as in Example 1, except that a resin comprising 50 wt % of BELLPET-EFG6C polyethylene terephthalate (produced by Bell Polyester Products, Inc.) and 50 wt % of BELLPET-PIFG8 isophthalic acid copolymerized polyethylene terephthalate (produced by Bell Polyester Products, Inc.) was used to form Layer A-2.

Example 3

A multilayer stretched film of the present invention was formed in the same manner as in Example 1, except that a resin comprising 97 wt % of UBE Nylon 1022B aliphatic polyamide nylon-6 (produced by Ube Industries Ltd.) and 3 wt % of Selar PA amorphous nylon (produced by DuPont-Mitsui Polychemicals Co., Ltd.) was used to form Layer B.

Example 4

A multilayer stretched film of the present invention was formed in the same manner as in Example 1, except that a resin comprising 75 wt % of UBE Nylon 1022B aliphatic polyamide nylon-6 (produced by Ube Industries Ltd.) and 25 wt % of Selar PA amorphous nylon (produced by DuPont-Mitsui Polychemicals Co., Ltd.) was used to form Layer B.

Example 5

Layer D-1 formed of ADMER SF731 modified polyolefin (produced by Mitsui Chemicals, Inc.) and Layer D-2 formed of ADMER SF731 modified polyolefin (produced by Mitsui Chemicals, Inc.) were used as Layers D. They were laminated in the order of Layer A-1/Layer D-1/Layer B/Layer D-2/Layer A-2, to obtain a five-layered film having a thickness of 15 μm in the same manner as in Example 1. Here, the temperature at which Layer D-1 and Layer D-2 were extruded was 220° C. The thickness of each layer was as follows. Layer A-1: 2 μm, Layer D-1:1 μm, Layer B: 9 μm, Layer D-2: 1 μm, and Layer A-2: 2 μm.

Layer C formed of silicon oxide having a thickness of 60 nm was formed on the Layer A-2 side of the resulting film using a vacuum deposition device with a vacuum of 1×10$^{-4}$ Torr to obtain the multilayer stretched film of the present invention.

Comparative Example 1

A monolayer stretched film formed of Layer B was produced using a resin containing 90 wt % of UBE Nylon 1022B aliphatic polyamide nylon-6 (produced by Ube Industries Ltd.) and 10 wt % of Selar PA amorphous nylon (produced by DuPont-Mitsui Polychemicals Co., Ltd.). A stretched film for comparison was produced by providing Layer C formed of silicon oxide on the resulting film in the same manner as in Example 1.

Comparative Example 2

A monolayer stretched film consisting of Layer A was produced using BELLPET-EFG6C polyethylene terephthalate (produced by Bell Polyester Products, Inc.). A stretched film for comparison was produced by providing Layer C formed of silicon oxide on the resulting film in the same manner as in Example 1.

Comparative Example 3

Production of a stretched film was attempted in the same manner as in Example 1 except that Layer B consisting of UBE Nylon 1022B aliphatic polyamide nylon-6 (produced by Ube Industries Ltd.) was used; however, much damage occurred during extension and a multilayer stretched film could not be obtained.

Comparative Example 4

A stretched film for comparison was produced in the same manner as in Example 1 except that a resin containing 60 wt % of UBE Nylon 1022B aliphatic polyamide nylon-6 (produced by Ube Industries Ltd.) and 40 wt % of Selar PA amorphous nylon (produced by DuPont-Mitsui Polychemicals Co., Ltd.) was used to form Layer B.

Table 1 shows the thickness of each of the layers in Examples 1 to 5 and Comparative Examples 1 to 4.

TABLE 1

| | Layer structure |
|---|---|
| Example 1 | Layer A-1 (2 μm)/Layer B (11 μm)/Layer A-2 (2 μm)/Layer C (60 nm) |
| Example 2 | Layer A-1 (2 μm)/Layer B (11 μm)/Layer A-2 (2 μm)/Layer C (60 nm) |
| Example 3 | Layer A-1 (2 μm)/Layer B (11 μm)/Layer A-2 (2 μm)/Layer C (60 nm) |
| Example 4 | Layer A-1 (2 μm)/Layer B (11 μm)/Layer A-2 (2 μm)/Layer C (60 nm) |
| Example 5 | Layer A-1 (2 μm)/Layer D-1 (1 μm)/Layer B (9 μm)/Layer D-2 (1 μm)/Layer A-2 (2 μm)/Layer C (60 nm) |
| Comparative Example 1 | Layer A (15 μm)/Layer C (60 nm) |
| Comparative Example 2 | Layer B (12 μm)/Layer C (60 nm) |
| Comparative Example 3 | Layer A-1 (2 μm)/Layer B (11 μm)/Layer A-2 (2 μm) |
| Comparative Example 4 | Layer A-1 (2 μm)/Layer B (11 μm)/Layer A-2 (2 μm)/Layer C (60 nm) |

Test Example 1

The multilayer stretched films obtained in Examples 1 to 5 and Comparative Examples 1 to 4 were evaluated for oxygen permeability under dry conditions, oxygen permeability under wet conditions, and oxygen permeability after bending. Table 2 shows the results.

Oxygen Permeability

Measurements were taken for oxygen permeability (gas barrier properties) using an OX-TRAN Model 200 (produced by MOCON Inc. according to JIS K 7126. Oxygen permeability at 20° C.×65% RH was determined as the oxygen permeability under dry conditions and that measured at 20° C.×90% RH was determined as the oxygen permeability under wet conditions.

Bending Resistance Test

Bending resistance was evaluated using a Gelbo flex tester produced by Rikagaku Kogyo K.K., in the following manner. Each multilayer stretched film sample was formed into a cylindrical bag having a layflat width of 150 mm and a length of 300 mm. The bag was attached to a Gelbo flex tester, and flexed 10 times at an ordinary temperature (20° C.) and 65% RH at a torsional angle of 440°, and with a bending spreading motion of 15 cm.

Oxygen permeability was measured after the bending resistance test in the same manner as described above using an OX-TRAN Model 200 (produced by MOCON Inc.) according to JIS K 7126 at 20° C.×65% RH.

TABLE 2

|  | Oxygen permeability ($ml/m^2 \cdot day \cdot MPa$) | | Oxygen permeability after bending ($ml/m^2 \cdot day \cdot MPa$) |
| --- | --- | --- | --- |
|  | 20° C. × 65% RH | 20° C. × 90% RH | 20° C. × 65% RH |
| Example 1 | 6 | 10 | 61 |
| Example 2 | 9 | 12 | 71 |
| Example 3 | 6 | 10 | 60 |
| Example 4 | 6 | 9 | 67 |
| Example 5 | 6 | 10 | 53 |
| Comparative Example 1 | 13 | 99 | 64 |
| Comparative Example 2 | 6 | 6 | 349 |
| Comparative Example 3 | — | — | — |
| Comparative Example 4 | 5 | 18 | 242 |

As shown in Table 2, all of the multilayer stretched films obtained in Examples 1 to 5 exhibited excellent oxygen permeability under both dry and wet conditions and excellent oxygen permeability after bending.

In contrast, the multilayer stretched film of Comparative Example 1, in which Layer A was not provided, showed unsatisfactory oxygen permeability under wet conditions. The multilayer stretched film of Comparative Example 2, in which Layer B was not provided, and the multilayer stretched film of Comparative Example 4, which had a large content of aromatic polyamide in Layer B, showed unsatisfactory oxygen permeability after bending. In Comparative Example 3, in which Layer B did not contain aromatic polyamide, formation of a stretched film was not achieved.

The above results clarified that a multilayer stretched film with barrier property comprising a biaxially stretched multilayer film having Layer A, Layer B, and Layer A in this order, and Layer C on at least one surface thereof, wherein Layer A contains crystalline polyester, Layer B contains 70 to 99 wt % of aliphatic polyamide and 1 to 30 wt % of aromatic polyamide, and Layer C contains an inorganic substance exhibits excellent oxygen permeability under dry conditions, excellent oxygen permeability under wet conditions, and excellent oxygen permeability after bending.

The invention claimed is:

1. A multilayer stretched film with barrier property obtained by biaxially stretching a multilayer laminate comprising at least three layers, namely, a polyester-based resin layer (Layer A), a polyamide-based resin layer (Layer B), and a polyester-based resin layer (Layer A), in this order (wherein the two Layers A may be the same or different) to obtain a biaxially stretched multilayer film; and providing a deposition layer (Layer C) on at least one surface of the biaxially stretched multilayer film;
   both of the Layers A containing a crystalline polyester;
   Layer B containing 70 to 99 wt % of aliphatic polyamide and 1 to 30 wt % of aromatic polyamide; and
   Layer C containing an inorganic substance.

2. The multilayer stretched film with barrier property according to claim 1, wherein the total thickness of Layers A is 1 to 20 μm, the thickness of Layer B is 5 to 49 μm, and the total thickness of the biaxially stretched multilayer film is 10 to 50 μm.

3. The multilayer stretched film with barrier property according to claim 1, wherein the crystalline polyester contained in Layers A is at least one member selected from the group consisting of polyethylene terephthalates (PETs), isophthalic acid copolymerized polyethylene terephthalates, polybutylene terephthalate, and sulfoisophthalic acid copolymerized polyethylene terephthalates.

4. The multilayer stretched film with barrier property according to claim 1, wherein the aliphatic polyamide-based resin contained in Layer B is at least one member selected from the group consisting of nylon-6 and copolymers of nylon-6 and nylon-6,6.

5. The multilayer stretched film with barrier property according to claim 1, wherein the aromatic polyamide-based resin contained in Layer B is polymethaxyleneadipamide or amorphous nylon.

6. The multilayer stretched film with barrier property according to claim 1, wherein the inorganic substance contained in Layer C is at least one member selected from the group consisting of silicon oxide, aluminum oxide, magnesium oxide, and aluminum.

7. A packaging film obtained by laminating a sealing layer on the deposition layer of the multilayer stretched film with barrier property of claim 1.

8. A packaging bag obtained by forming the packaging film of claim 7 into a bag-like shape, and then heat-sealing facing surfaces of the sealing layer.

9. A package comprising the packaging bag of claim 8 with content placed inside.

* * * * *

UNITED STATES PATENT AND TRADEMARK OFFICE
CERTIFICATE OF CORRECTION

| | | |
|---|---|---|
| PATENT NO. | : 8,481,137 B2 | Page 1 of 1 |
| APPLICATION NO. | : 13/160925 | |
| DATED | : July 9, 2013 | |
| INVENTOR(S) | : Norio Uehara et al. | |

It is certified that error appears in the above-identified patent and that said Letters Patent is hereby corrected as shown below:

On the title page, Item (30);
Delete

"(30)     Foreign Application Priority Data

Nov. 5, 2009    (JP) .............................2009-253686"

Signed and Sealed this
Twenty-fourth Day of September, 2013

Teresa Stanek Rea
*Deputy Director of the United States Patent and Trademark Office*